July 14, 1964   L. C. PARODE ETAL   3,141,163
RANGE GATING SYSTEM WITH NARROW BAND FILTERING
Filed Aug. 6, 1958   4 Sheets-Sheet 1

Fig. 1.

INVENTORS.
LOWELL C. PARODE,
DON R. HOLCOMB,
BY
Walter J. Adam
ATTORNEY.

July 14, 1964    L. C. PARODE ETAL    3,141,163
RANGE GATING SYSTEM WITH NARROW BAND FILTERING
Filed Aug. 6, 1958    4 Sheets-Sheet 2

FIG. 2.

INVENTORS.
LOWELL C. PARODE,
DON R. HOLCOMB,
BY
Walter J. Adam
ATTORNEY.

United States Patent Office 3,141,163
Patented July 14, 1964

3,141,163
RANGE GATING SYSTEM WITH NARROW
BAND FILTERING
Lowell C. Parode, Manhattan Beach, and Don R. Holcomb, Los Angeles, Calif., assignors to Hughes Aircraft Company, Culver City, Calif., a corporation of Delaware
Filed Aug. 6, 1958, Ser. No. 754,697
18 Claims. (Cl. 343—7.3)

This invention relates to range gating systems for radar receivers and particularly to a system for time gating a pulsed signal while utilizing narrow band filtering of the signal.

In the prior art, pulsed radar range gating systems are generally arranged to respond to pulses of video frequency signals for time gating the pulses through the range gate at video frequency. The pulses of the video signals are passed through an early gate circuit and a late gate circuit to form signals which are utilized to form a resultant D.C. (direct current) error signal. The video signal utilized is derived from the envelope of the IF (intermediate frequency) signal received from the amplifier. These prior art systems have a disadvantage in that they will not function with narrow band filtering of the IF signal, which filtering may be utilized to eliminate sideband noise signals such as noise scintillation signals or jamming signals associated with a pulsed echo signal. Another advantage of narrow band filtering is to reduce the required dynamic range of the circuitry in the system so that the detectors may be operated in more stable and reliable range. This filtering of the signals results in only the carrier wave of the echo signal passing through the amplifier and through the receiver. Attempts to control the time gate with the carrier wave in most of the prior art gating systems will not yield sufficient information to determine the time of reception of the pulse. One prior art system which allowed the range gating to occur in the IF section was the jittered gating system. In the jittered system the time of gating of a range gate circuit is changed continually between an early and a late time position of the pulses and the output signal is phase detected to determine if the centroid of the signal passed through the jittered range gate is early in time or late in time. This system has the disadvantages of being susceptible to jamming of the range tracking loop and of forming undesired sideband signals at the jitter rate to make detection unreliable. Therefore, prior methods of time gating are inapplicable to radar receiver systems utilizing narrow band filtering.

It is therefore an object of this invention to provide a radar receiver system which time gates the pulsed signals while providing for elimination of jamming signals.

It is a further object of this invention to provide a monopulse radar receiver which utilizes a single amplifier channel by filtering and multiplexing of the input signals and which carries out time gating of the input signals with a minimum of components.

It is a still further object of this invention to provide a range gating system which operates with a high degree of efficiency to enable a radar receiver system to utilize narrow band filtering for preventing susceptibility to sideband components such as jamming signals.

It is another object of this invention to provide a range gating system which has a high degree of freedom from interference of its operation by jamming and interference signals.

According to one feature of this invention, a pulsed radar receiver includes a range gate circuit for time gating the pulses of IF (intermediate frequency) signals received from an antenna and mixer system, the IF signals including a carrier wave with associated undesired sideband components and including pulse modulated spectral components appearing periodically at frequencies determined by the pulse repetition frequency. The pulses of IF signals then pass through an early gate circuit and a late gate circuit which control portions of the pulses passed through each gate in response to the time position of the gates, to provide two gated signals having characteristics indicating the time position. The gated signals are then passed through narrow band filter means which act to filter out the spectral components and the undesired sideband components and to pass only the carrier waves, which waves are passed as continuous waves because of the storage characteristics of the filters. The carrier waves have amplitude characteristics indicating the time position of the early and late gates. The carrier waves are multiplexed or balance modulated and combined with a reference carrier wave from the output of the antenna and mixer system, and then passed through detecting means. The detecting means form D.C. signals in response to the phase and amplitude characteristics of the modulated carrier waves, which signals are passed to a range tracking generator. The tracking generator forms gating signals which control the time position of the early gate circuit, late gate circuit and the range gate circuit. Therefore, the time gating system of this invention provides self synchronous gating at IF while allowing filtering of the IF signals for passing only the carrier waves through the majority of the receiver.

The novel features which are believed to be characteristic of the invention both as to its ogranization and method of operation, together with the further objects and advantages thereof, will be better understood from the following description considered in connection with the accompanying drawings in which.

Figure 1:
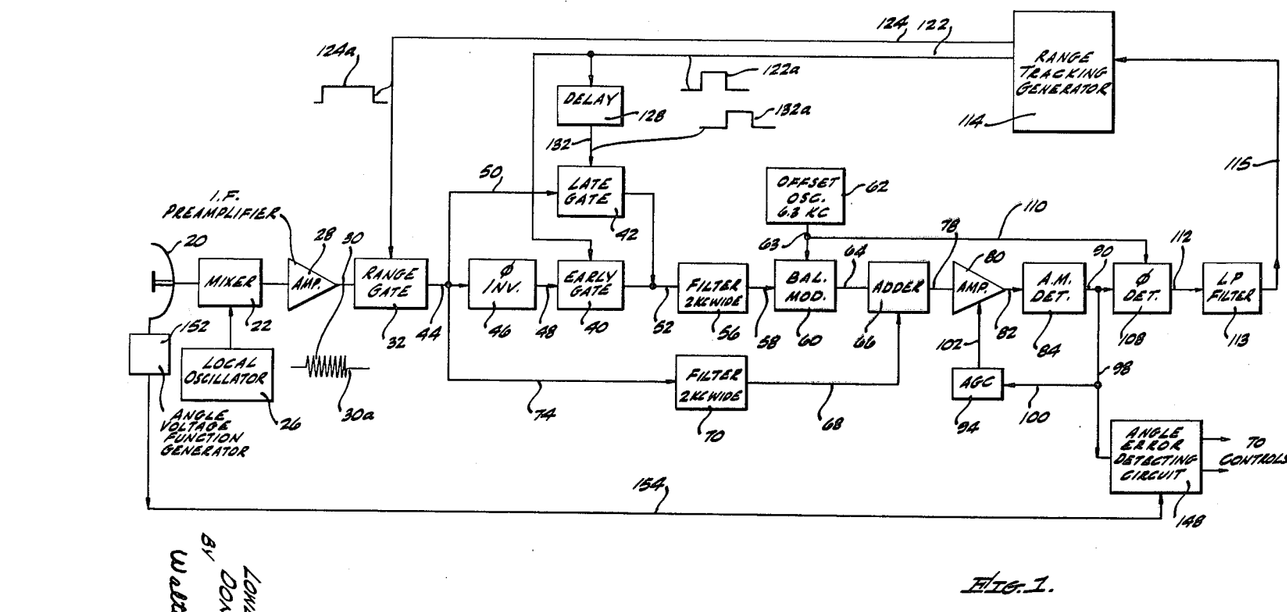
FIG. 1 is a block diagram of a pulsed radar receiver including a range gating system in accordance with this invention.

Referring first to FIG. 1, a block diagram is shown of pulsed radar receiver including one form of a range gating system in accordance with this invention. The radar receiver intercepts pulsed echo signals at radio frequency by an antenna 20 which may be of the conical scan or monopulse type. The antenna 20 is described as a conical scan type, for example. It is to be noted that narrow band filtering may be used with a conical scan antenna system to increase the reliability of the detection operations. Thus narrow band filtering is desired when an angle scan frequency which is passed through all filters in the system is utilized. A mixer 22 is connected to the antenna 20 for heterodyning the pulses of radio frequency signals to pulses of IF (intermediate frequency) signals. A local oscillator 26 is connected to the mixer 22 for controlling the intermediate frequency of the signals and as well known, the local oscillator 26 may be controlled by a frequency tracking loop (not shown). An IF preamplifier 28 is connected to the mixer 22 for amplifying the IF signals to improve the signal to noise ratio of the receiver. The preamplifier 28 has a wide frequency band for passing and amplifying all sideband components of the intermediate frequency signal, as will be discussed.

A range gate circuit 32 is connected to the preamplifier 28 by a lead 30 for gating the pulses of the IF signals received from the preamplifier 28 as shown by a waveform 30a. The range gate circuit 32 is controlled by a conventional early gate circuit 40 and a late gate circuit 42. A phase inverter 46 is connected to the range gate circuit 32 by a lead 44 and is connected to the early gate circuit 40 by a lead 48. The late gate circuit 42 is connected to the lead 44 by a lead 50. The outputs of the early gate circuit 40 and the late gate circuit 42 are connected together to form a lead 52. Thus, the IF signal from the range gate circuit 32 is passed directly to the late gate 42 and is passed to the early gate 40 after being inverted in the phase inverter 46.

A filter 56 is connected to the lead 52 for passing a narrow frequency band of 2 kc. centered at the intermediate frequency. A balanced modulator 60 is connected to the filter 56 by a lead 58 for modulating the filtered IF signal to sideband signals, and an offset oscillator 62 is connected to the balanced modulator 60 by a lead 63 for controlling the frequency of the modulated sideband signals, as will be discussed. The balanced modulator 60 may be a conventional balanced modulating circuit which suppresses the carrier wave, as is well known in the art. An adder 66 which may be a conventional adding resistor network, is connected to the output of the balanced modulator 60 by a lead 64. A second input to the adder 66 is a lead 68 connected to a filter 70 which passes a narrow frequency band of 2 kc. similar to the filter 56. The filter 70 is connected to the lead 44 by a lead 74 for receiving the pulses of the IF signal as shown by the waveform 30a. An amplifier 80 is connected to the output of the adder 66 by a lead 78. The amplifier 80 provides a single amplifying channel for amplifying the IF signal, thus eliminating the phase and amplitude balancing problems associated with a plurality of amplifiers arranged in parallel such as is utilized in some pulsed radar receivers.

An amplitude modulation (AM) detector 84, which is a conventional envelope detector, is connected to the output of the amplifier 80 by a lead 82. The output signal of the AM detector 84, as will be explained hereinafter, appears on a lead 90 which is connected to the output of hte AM detector 84. The lead 90 is connected to an automatic gain control (AGC) circuit 94 by way of a lead 98 and a lead 100. The AGC circuit 94 is connected to the amplifier 80 by a lead 102 for controlling the amplification so as to normalize the signal out of the amplifier 80, as is well known in the art.

A phase detector 108 is connected to the lead 90 for also receiving the output signal of the AM detector 84 and is connected to the lead 63 by a lead 110 for receiving a reference wave from the offset oscillator 62. The phase detector 108 is a conventional circuit responding to the amplitude of the signals at its input and phase referenced by the wave from the offset oscillator 62 to form a D.C. error signal, as will be discussed hereinafter. A low pass type filter 113 is connected to the phase detector 108 by a lead 112. A range tracking generator 114 is connected to the output of the low pass filter 113 by a lead 115. The output of the range tracking generator 114 is connected by a lead 122 to the early gate 40 and to a delay line 128. The delay line 128 is connected to the late gate 42 by a lead 132. An early gate signal as shown by a waveform 122a is developed by the range tracking generator 114 to control the early gate 40 and a late gate signal as shown by a waveform 132a is received from the delay line 128 to control the late gate 42.

The output of the range tracking generator 114 is also connected to the range gate 32 by a lead 124. A gating signal as shown by a waveform 124a is developed by the range tracking generator 114 and is passed on the lead 124 to control the range gate 32. The range tracking generator 114 is a conventional range gate pulse generator for forming pulses as shown by the waveforms 122a and 124a at times determined by the voltage of the D.C. error signal, as will be explained hereinafter.

The signal on the lead 90 is also passed on the lead 98 to an angle error detecting circuit 148. The angle error detecting circuit 148 also receives an input from an angle voltage function generator 152 by way of a lead 154. As is well known, the angle error detecting circuit 148 acts to detect directional information of the source of the echo signal relative to the antenna 20. The angle voltage function generator 152 is a conventional circuit for providing voltage waves corresponding in phase to the angle of the conically scanning antenna 20. The output signals (not shown) of the angle error detecting circuit 148 pass to control circuitry which may control the direction of the antenna 20 or may control the direction of flight of an aircraft.

Figure 4:
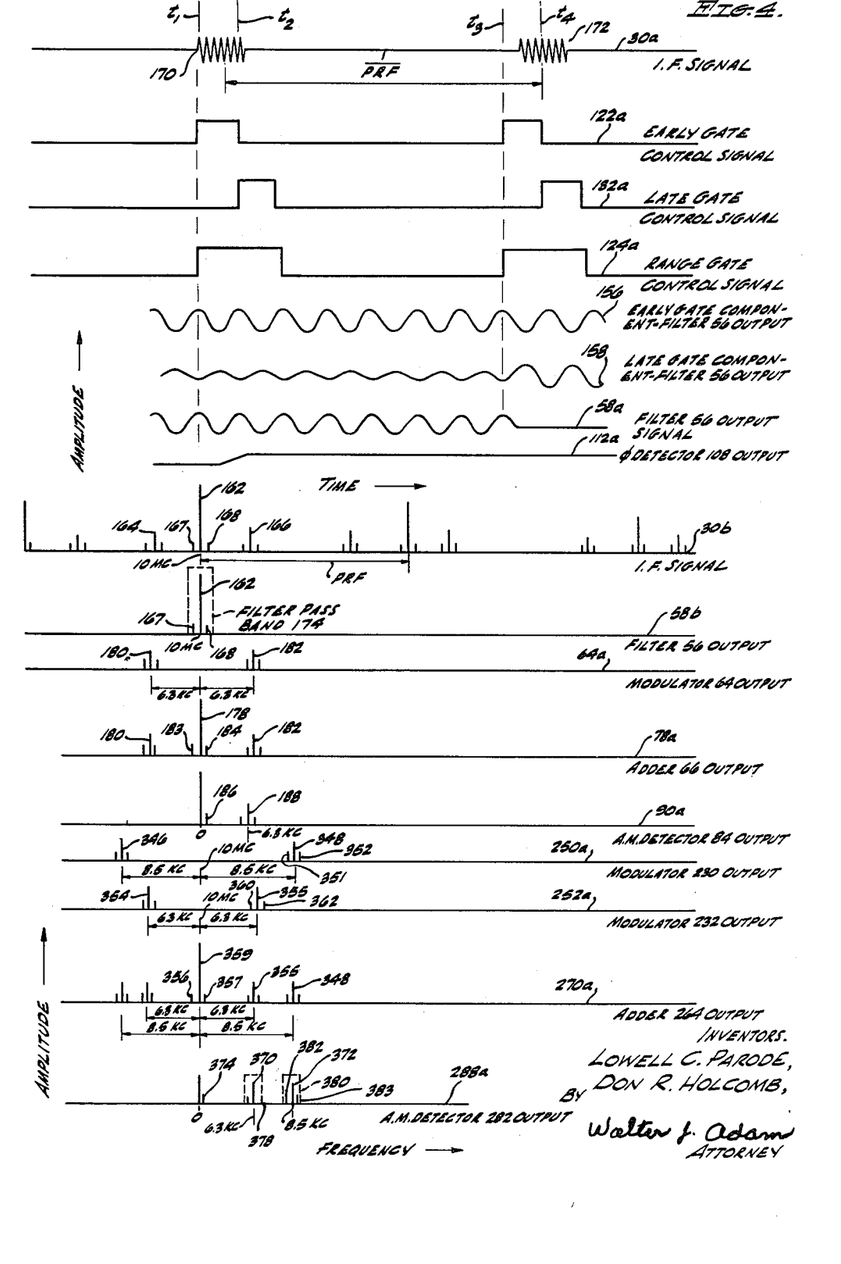
FIG. 4 is a graph of waveforms and spectral diagrams for illustrating the operation of the range gating system of FIGS. 1, 2 and 3.

Referring now to FIG. 4 which is a graph of waveforms and spectral diagrams for explaining the operation of the range gating system of this invention, as well as referring to FIG. 1, the operation of the range gating system of FIG. 1 will be explained in greater detail. The IF signal as shown by the waveform 30a is similar to the echo signal (not shown) received by the antenna 20 except that it has been heterodyned to an intermediate frequency in the mixer 22 and amplified in the IF preamplifier 28. The IF signal of the waveform 30a includes a pulse 170 and a pulse 172 occurring at times indicated by the inverse of a pulse repetition frequency (PRF) which varies with a varying range rate of the target or source of the echo signals. The spectral diagram of the IF signal is shown by a diagram 30b which illustrates the conventional pulse modulated sideband components or spectral lines of a carrier wave 162 of a conventional conical scan type antenna, the spectral lines occurring at frequencies which are separated by the pulse repetition frequency (PRF). The intermediate frequency may be 10 mc. (megacycles). The spectral lines such as the carrier wave 162 shown in the diagram 30b has a pair of sideband noise components 164 and 166 associated with it for example. The sideband noise components 164 and 166 may be formed by amplitude scintillation or by a source of jamming signals and may be at any frequency separation from the carrier wave. Without affecting the system operation the sideband components 164 and 166 may even be at a frequency of 6.3 kc. on either side of the carrier wave 162 which may be the frequency separation of operation, as will be discussed. The frequency of 6.3 kc. which is the frequency of the oscillator 62 is selected to be a frequency that is relatively large compared to the 2 kc. passband of the filters so that the sideband signals developed at the balanced modulator 60 are outside of the passband. Also, the selected frequency of the oscillator 62 must be low enough so that the sidebands developed by the modulators are within the passband of the amplifier such as 80. Because the sideband noise signals intercepted by the antenna 20 are filtered out by the filter 56 and 70 before modulation and summing, these noise signals have substantially no effect on the system operation. On each side of the carrier wave 162 and other spectral lines are angle scan components such as 167 and 168 which contain directional information derived from the antenna 20. The range gating system of this invention allows narrow band filtering to remove the sideband components 164 and 166 as well as all other spectral lines as illustrated in the diagram 30b, except the angle scan components 167 and 168.

The range gate control signal on the line 124 is illustrated by the waveform 124a. The early gate control signal and the late gate control signal on the lines 122 and 132 are illustrated by the waveforms 122a and 132a. For purposes of explanation, the pulse 170 is shown as occurring earlier than a previous pulse of the waveform 30a, thus indicating a change of range rate of the antenna 20 to a target and an increasing PRF. Thus, the early gate control signal of the waveform 122a and the range gate control signal of the waveform 124a occur at a time after the interception of the pulse 170. As will be explained, the time of occurrence of the early gate, late gate and range gate control signals of the waveforms 122a, 132a and 124a is determined by the D.C. voltage of a waveform 112a passed into the range tracking generator 114 from the phase detector 108. Between the times $t_1$ and $t_2$, a large portion of the pulse 170 is passed through the early gate 40 as indicated by the control signal of the waveform 122a. At time $t_2$ the late gate control signal of the waveform 132a is passed to the late gate 42 to allow a small portion of the pulse 170 to pass through late gate 42. Thus, it can be seen that the early gate portion of pulse 170 and the late gate portion of pulse 170 are passed through the early gate 40 and the late gate 42 sequentially but at different times. In order to distinguish between the two portions of the pulse 170, the signal passed through the early gate 40 is inverted in the phase inverter 46. The early gate portion and the late gate portion of pulse 170 are then passed through the filter 56 on the lead 52. The filter output as shown by a diagram 58b includes only the carrier wave 162 and the angle scan signals 167 and 168 since a filter pass band 174 with a narrow pass band of 2 kc., for example, filters out the sideband components such as the sideband noise signals 164 and 166 of the diagram 30b. The filter 56 is of good quality such that the amplitude response outside of the transmission band is down 60 or more decibels, for example. It is to be noted that the carrier wave 162 of the waveform 30b, is passed into the filter 56 only during the duration of the pulse 170. However, the filter 56 which may be a conventional L-C type filter, has storage characteristics to provide the carrier wave 162 of the diagram 58b as a continuous wave. As is well known in the art, a pulsed signal is a spectral combination of continuous wave signals spaced in frequency by the pulse repetition frequency and having phase relations to form the pulses. Thus, by applying the pulsed signal similar to the waveform 30a to the narrow band filter 56 so as to pass a spectral portion thereof, a continuous wave is provided at the filter output.

The early gate component or early gate portion of the signal passed through the early gate 40 and through the filter 56 is a continuous carrier wave at the output of the filter 56 as shown by a waveform 156. The late gate component or late gate portion of the pulse 170 passed through the late gate 42 and through the filter 56 is a continuous carrier wave at the output of the filter 56 as shown by a waveform 158. The waveforms 156 and 158 are continuous wave signals because of the operation of the narrow band filter 56, as discussed above. The early gate and late gate components of the waveforms 156 and 158 are 180° out of phase because of the action of the phase inverter 46 as was previously explained. The resultant common signal at the output of the filter 56 is shown by a waveform 58a, this filter output signal being the sum of the early gate and the late gate components of the waveforms 156 and 158. Thus the filter output signal of the waveform 58a contains the information derived from the early gate 40 and the late gate 42 to provide time correction to the range gate 32, as will be explained.

The filter output signal of the waveform 58a passes into the balanced modulator 60 which acts to form sideband signals 180 and 182 of a diagram 64a while suppressing the carrier wave 162 to give a modulator output signal as shown by the diagram 64a. The 6.3 kc. frequency of the offset oscillator 62 modulates the sidebands 180 and 182 of the waveform 64a at a frequency of 6.3 kc. on either side of the frequency of the carrier wave 162 which may be 10 mc. as shown by the diagram 58b. The modulator output signal of the diagram 64a then passes into the adder 66. An output signal of the filter 70 is passed to the lead 68 and is similar to the carrier wave 162 of the diagram 58b. The adder 66 acts to combine the carrier wave on the lead 68 with the sideband signals 180 and 182 of the modulator output signal of the diagram 64a to form a combined adder output signal as shown by the diagram 78a. The carrier wave 178 from the lead 68 is a reference signal and carries amplitude information for normalizing the amplifier 80, as is well known in the art. The sideband components 180 and 182 of the waveform 78a have an amplitude indicative of the amplitude of the filter output signal of the waveform 58a, thus representing the range gating information. Angle scan components such as 183 and 184 have amplitudes and phases indicative of the directional error of the antenna 20.

The AM detector 84 receives the output signal of the amplifier 80 which is similar to the signal of the diagram 78a except amplified and shifts the signal in frequency so the carrier wave 178 of the diagram 78a is frequency shifted to a D.C. voltage. The detector output signal from the AM detector 84 thus appears as shown by a diagram 90a. The D.C. voltage of the diagram 90a controls the AGC circuit 94 for normalizing the signal out of the amplifier 80 to a reference value and the angle scan signal 186 is utilized in the angle error detecting circuit 148 to provide directional information. The sideband signal 188 of the diagram 90a is passed to the phase detector 108 in combination with a reference wave on the lead 110 (not shown). The phase detector 108 responds to the amplitude of the sideband signal 188 of the diagram 90a which has similarity of amplitude to the combined filter output signal of the waveform 58a, to form a D.C. signal on the lead 112 as shown by the waveform 112a. The angle scan signals 186 of the diagram 90a or scan frequency modulations associated with the D.C. signal 112a are attenuated by the low pass filter 113, which may have a band width of D.C. to 10 cycles.

Since the majority of the pulse 170 has passed through the early gate 40, the D.C. level of the waveform 112a changes at approximately time $t_2$ to correct the early gate 40, the late gate 42 and the range gate 32 so as to pass the next pulse received by the antenna 20, which is the pulse 172, equally through the early gate 40 and the late gate 42 and through the center of the range gate 32. The signal of the waveform 112a with the corrected D.C. level after time $t_2$ on the 112 passes into the range tracking generator 114 to correct the time of formation of the next early gate control signal of the waveform 122a and the range gate control signal of the waveform 124a.

At time $t_3$, the early gate control signal of the waveform 122a and the range gate control signal of the waveform 124a rise to their upper voltage level and are passed to the early gate 40 and to the range gate 32 to open the range gate and pass the pulse 172. The late gate control signal of the waveform 132a is formed to open the late gate 42 at a time $t_4$ which is approximately the time center of the pulse 172. Thus, equal portions of the pulse 172 are passed through the early gate 40 and through the late gate 42 and the entire pulse 172 is passed through the range gate 32. The early gate component of the waveform 156 and the late gate component of waveform 158 are thus equal in amplitude while being 180° out of phase. Therefore, the filter output signal of the waveform 58a appears as a D.C. signal indicating that the pulse 172 is centered time wise on the early gate control signal of the waveform 122a and the late gate control signal of the waveform 132a.

Thus, the apparent change in PRF resulting from a varying rate of range change of a target, for example, and which reflected an error at time $t_1$ has been corrected at time $t_3$ to result in the range gate control signal of the waveform 124a being centered on the pulse 172. A decrease of the PRF resulting from a change of range rate would be corrected similar to the correction discussed except a large portion of the pulse 170 would pass through the late gate 42 to result in a correction in the opposite time direction. It is to be noted that the error illustrated is larger than normally occurs since the smallest change in amplitude of the early gate and late gate component of the waveforms 156 and 158 will be reflected in the waveform 58a to result in a time correction of the early and late gate control signals 122a and 132a and the range gate control signal 124a.

The angle scan component 186 of the diagram 90a passes to the angle error detecting circuit 148 and in combination with a reference signal (not shown) from the angle voltage function generator 152, forms error signals which are passed to the controls, as discussed previously. Thus, a gating system in the IF section of the radar receiver has been described for use in combination with narrow band filtering of the pulsed signal passed through a pulsed radar receiver. The narrow band filtering removes undesired sideband components which may give inaccurate directional information during the detecting operations.

Figure 2:
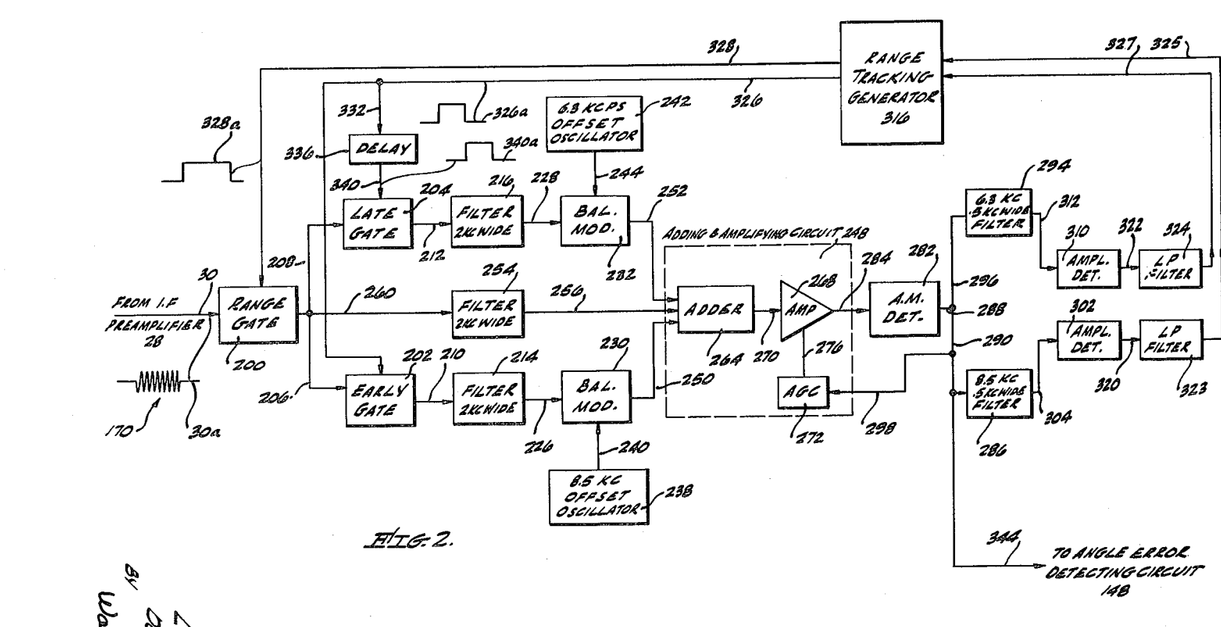
FIG. 2 is a block diagram of a portion of the radar receiver of FIG. 1 showing a second form of a range gating system in accordance with this invention.

Referring now to FIG. 2 a block diagram is shown of a portion of the radar receiver of FIG. 1 showing a second form of the range gating system in accordance with this invention. A range gate circuit 200 is connected from the IF preamplifier 28 of FIG. 1 by the lead 30 and receives pulses as shown by the pulse 170 of the waveform 30a. An early gate 202 and a late gate 204 are connected to the output of range gate 200 by a lead 206 and a lead 208, thus not utilizing the phase inverter as described in FIG. 1. A filter 214 is connected to the early gate 202 by a lead 210 and a filter 216 is connected to the late gate 204 by a lead 212. It is to be noted that the filters 214 and 216 have a narrow frequency pass bandwidth of 2 kc. centered at the intermediate frequency similar to the filters discussed in relation to FIG. 1. A balanced modulator 230 is connected to the filter 214 by a lead 226 and a balanced modulator 232 is connected to the filter 216 by a lead 228. The balanced modulator 230 is connected to an offset oscillator 238 by a lead 240 and the balanced modulator 232 is connected to an offset oscillator 242 by a lead 244, the offset oscillator 238 developing a wave having a frequency of 8.5 kc. and the offset oscillator 242 developing a wave having a frequency of 6.3 kc. Thus it can be seen that the outputs of the filters 214 and 216 are separately modulated to two different sideband frequencies, as will be explained hereinafter. An adding and amplifying circuit 248 is connected to receive the modulated signals from the balanced modulators 230 and 232 through leads 250 and 252 and is connected to a filter 254 by a lead 256. The filter 254 is connected to the output of the range gate 200 by a lead 260 for passing a reference carrier wave to the adding and amplify circuit 248, as will be discussed hereinafter. The filter 254 is similar to the filters 214 and 216.

The adding and amplifying circuit 248 includes an adder 264 connected to the leads 250, 256, and 252 and includes an amplifier 268 connected to the adder 264 by a lead 270. An AGC circuit 272 is also included in the adding and amplifier circuit 248 connected to the amplifier 268 by a lead 276 for normalizing the amplification of the amplifier 268, as discussed in relation to FIG. 1. An AM detector 282 is connected to the output of the amplifier 268 by a lead 284. The output of the AM detector 282 is connected to a lead 288 which is connected to a filter 286 by a lead 290 and is connected to a filter 294 by a lead 296. The lead 290 is connected to the AGC circuit 272 by a lead 298 for controlling the amplification of the amplifier 268, as discussed. The filters 286 and 294 have a narrow pass band of .5 kc. centered at a frequency of 8.5 kc. and 6.3 kc., respectively, for separating the modulated sideband signals, as will be discussed.

An amplitude detector 302 is connected to the output of the filter 286 by a lead 304 and an amplitude detector 310 is connected to the output of the filter 296 by a lead 312. A low pass filter 323 is connected to the amplitude detector 302 by a lead 320 and a low pass filter 324 is connected to the amplitude detector 310 by a lead 322. A range tracking generator 316 is connected to the outputs of the filters 323 and 324 by leads 325 and 327. The range tracking generator 316 is connected to the early gate 202 by a lead 326 and is connected to a lead 332 which in turn is connected to a delay line 336. The output of the delay line 336 is connected to the late gate 304 by a lead 340. Thus an early gate control signal as shown by a waveform 326a controls the early gate 302 and a late gate control signal as shown by a waveform 340a controls the late gate 204. The range tracking generator 316 is similar to the range tracking generator 314 of FIG. 1 except the signals on the leads 325 and 327 are combined to form the control pulses. The range tracking generator 316 is connected to the range gate 200 by a lead 328. The range tracking generator 316 passes a range gate control pulse as shown by the waveform 328a for controlling the time of gating of the pulse as shown by the waveform 30a. The angle scan signals from the AM detector 282 indicating directional error of the target, as will be discussed, pass through the lead 290 to a lead 344 and to the angle error detecting circuit 148 of FIG. 1.

Referring now to FIG. 4 which is a graph of waveforms and spectral diagrams illustrating the operation of this invention, as well as referring to FIG. 2, the operation of the range gating system of FIG. 2 will be explained in further detail. Upon receiving the pulse 170 of the waveform 30a an early gate portion passes through the early gate 202 and a late gate portion passes through the late gate 204 similar to the example discussed in relation to FIG. 1. Also similar to the explanation of FIG. 1, the early gate portion and the late gate portion of the pulse 170 are passed through the filters 214 and 216 to form an early gate signal similar to the early gate component of the waveform 156 and a late gate signal similar to the late gate component of the waveform 158. The early gate and late gate signals are maintained in separate channels through the filters 214 and 216, while a combined signal is passed through the filter 56 of FIG. 1. A reference carrier wave is also passed through the filter 254 similar in appearance to the early gate component of the waveform 156. The early gate signal on the lead 226 is passed through the balanced modulator 230 which acts to suppress the carrier frequency and to form sideband signals as shown by the sideband signals 346 and 348 of a diagram 250a. The sideband signals 346 and 348 are modulated to a frequency of 8.5 kc. on either side of the frequency of the carrier wave of the IF signal from the filter 214 which may have a frequency of 10 mc., similar to the carrier wave 162 of the diagram 30b. Angle scan signals such as 351 and 352 are present on both sides of the sideband signals 346 and 348. The angle scan signals 351 and 352 may be arranged 100 cycles on either side of the sideband signal 348 resulting from a 100 cycle conical scan frequency of the antenna 20 of FIG. 1. The late gate signal on the lead 228 which is similar to the late gate component of the waveform 158 passes into the balanced modulator 232 which suppresses the carrier signal to form a signal having sideband signals 354 and 355 as shown by the diagram 252a. The sideband signals 354 and 355 have angle scan signals such as 360 and 362 associated therewith as discussed in relation to the diagram 250a. The sideband signals of the diagram 250a and 252a then pass to the adder 264 in combination with a carrier wave on the lead 256 to be combined into a common signal as shown by a diagram 270a. A carrier wave 359 is the signal received from the lead 256. It is to be noted that the sideband signals such as 348 and 355 of the diagram 270a are separated from each other in frequency.

The adder output signal of the diagram 270a then passes into the AM detector 282 where the frequency is shifted so the carrier wave 359 appears as a D.C. signal as shown by a diagram 288a. The sideband signals 355 and 348 of the diagram 270a now appear as sideband signals 370 and 372. The angle scan signal 357 now appears in the diagram 288a as an angle scan signal 374 and is passed through the lead 344 to the angle error detecting circuit 148 of FIG. 1. The AM detector output signal of the diagram 288a then passes through both the filters 286 and 294 which have a narrow frequency band of .5 kc. centered at the frequencies of 6.3 kc. and 8.5 kc., respectively. Thus, a filter pass band 378 and 380 acts to pass the sideband signals 370 and 372 to the leads 304 and 312, respectively. It is to be noted that angle scan signals such as 382 and 383 are also passed through the filters 286 and 294. The amplitude of the sideband signal 382 results in the amplitude detector 302 forming an angle scan modulated D.C. signal which is passed to the range tracking generator 316 and the amplitude of the sideband signal 370 results in the amplitude detector 310 forming an angle scan modulated D.C. signal which also passed to the range tracking generator 316. Low-pass type filters such as R-L filters 323 and 324 are employed after detectors 302 and 310 to attenuate the scan frequency modulation of the D.-C. range tracking control signal on the leads 320 and 322, as discussed in relation to FIG. 1. The relative amplitude of the signals 370 and 372 as shown by the diagram 288a thus control the time of formation of the early gate pulse as shown by the waveform 326a and the range gate pulse as shown by the waveform 328a of FIG. 2.

The range tracking system of FIG. 2 thus corrects variation of the time of reception of the pulse 170 similar to the action described in relation to FIG. 1, except that the signals passed through the early and late gate channel of FIG. 2 are balance modulated to two frequencies, are separated by filters and are amplitude detected. In the range tracking system of FIG. 2 the IF signal from the range gate 200 is not inverted and noncoherent amplitude detection is utilized for developing D.C. signals to control the range tracking generator 316. Also, because the portions of the pulses from the early gate 202 and the late gate 204 in FIG. 2 are not combined before filtering as in FIG. 1, separate balanced modulators 230 and 232 are utilized in combination with the filters 296 and 286 for separating the sideband signals.

Figure 3:
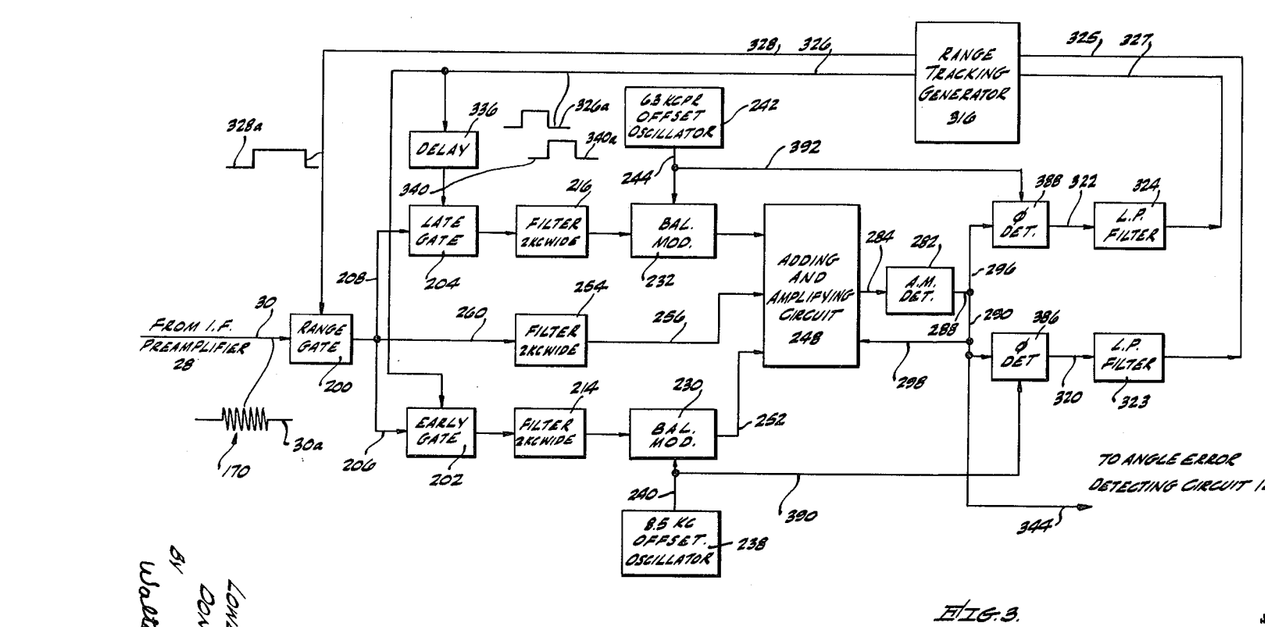
FIG. 3 is a block diagram of a portion of the radar receiver of FIG. 1 showing a third form of a range gating system in accordance with this invention.

Referring now to FIG. 3 a third form is shown of the range gating system in accordance with this invention. The system of FIG. 3 is similar to that described in FIG. 2 except that coherent phase detection is utilized instead of amplitude detection. The leads 290 and 296 connect to phase detectors 386 and 388 instead of to the filters 286 and 294 of FIG. 2. A lead 390 is connected from the lead 240 to the phase detector 386 and a lead 392 is connected from the lead 244 to the phase detector 388 for providing reference waves. The phase detectors 386 and 388 are conventional circuits responding to the amplitude of the signal on the leads 296 and 290 which is in phase with the reference waves on the leads 390 and 392. The phase detectors 386 and 388 are similar to the phase detector 108 of FIG. 1. The phase detector 386 and 388 are connected by the leads 320 and 322 to the low pass filters 323 and 324 which in turn are connected to the range tracking generator 316 by the leads 325 and 327. Referring now also to FIG. 4 the signal on the lead 288 is shown by the diagram 288a. The phase detectors 386 and 388 separate the sideband signals 370 and 372 to form D.C. signals on the leads 320 and 322, thus controlling the time of formation of the signals 326a and 328a out of the range tracking generator 316 and in turn controlling the early gate 202, the late gate 204 and the range gate 200. It is to be noted that the filter pass bands 378 and 380 of diagram 288a are not utilized in FIG. 3. Since the action of the range gating system of FIG. 3 is similar to the form described in relation to FIG. 2, the system of FIG. 3 will not be explained in further detail.

Thus there has been described a range gating system which includes both the range gate and the early and the late gates in the intermediate frequency portion of the pulsed radar receiver. The range gating system allows the radar receiver to utilize narrow band filtering of the intermediate frequency signals for passing only the carrier waves through the amplifier. The amplitude of the carrier waves passed through the filters indicate the time information for controlling the detecting means and the range tracking generator. Therefore, an improved range system has been described which allows range gating in combination with narrow band filtering for removing undesired components intercepted by the antenna such as sideband signals formed by amplitude scintillation or by enemy jamming.

What is claimed is:

1. A gating system for time gating pulses of signals received at varying times from a source, said system comprising: heterodyning means coupled to said source for receiving said pulses of signals and for developing pulses of intermediate frequency signals; a first gating means coupled to said heterodyning means for gating said pulses in response to first control signals; a second and a third gating means coupled to said first gating means to form first and second signals indicative of the time of reception of said pulses in relation to each other, said second and third gating means responding to second control signals; a fourth means coupled to said second and third gating means for receiving said first and second signals to develop first and second carrier waves separated in frequency; fifth means coupled to said first gating means for developing third carrier waves; combining means coupled to said fourth and fifth means to form a combined signal from said first, second and third carrier waves; and control means coupled to said combining means for forming said first and second control signals, said control means being coupled to said second and third gating means to apply said second control signals thereto for controlling said first and said second signal and coupled to said first gating means to apply said first control signals for controlling the time of gating of said pulses of intermediate frequency signals.

2. A system for time gating and for amplifying pulses of intermediate frequency signals in a pulsed radar receiver, said pulses being received at varying times from a source, said system comprising: gating means coupled to said source for gating said pulses, said gating means being controlled by timing signals; an early gate and a late gate circuit coupled to said gating means for forming first and second signals having characteristics indicative of the time of reception of said pulses, said early gate and said late gate circuit being controlled by timing signals; by-pass means coupled to said gating means for receiving said pulses and forming third signals having reference amplitude characteristics; combining means coupled to said early gate, said late gate and said by-pass means for combining said first, second and third signals into a combined signal having amplitude characteristics indicative of said time of reception of said pulses; amplifying means coupled to said combining means for amplifying said combined signal; and pulse forming means coupled to said amplifying means for receiving said combined signal and for forming said timing signals, said pulse forming means coupled to said early gate circuit and said late gate circuit for applying said timing signals for controlling said first and second signals and coupled to said gating means for applying said timing signals for controlling the time of gating said pulses of intermediate frequency signals.

3. A system for time gating and filtering pulses of intermediate frequency signals, said signals including undesired frequency components, said pulses being received at varying times from a source, said system comprising: gating means including a range gate coupled to said source for gating the pulses therethrough and including a control circuit coupled to said gating means for receiving said pulses therefrom and forming a first and second pulse having time characteristics indicative of the time of the reception of said pulses, said gating means having control inputs; filtering means coupled to said control circuit for filtering said first and second pulses and coupled to said range gate for filtering the pulse gated therethrough to remove said undesired frequency components, said filtering means forming third, fourth and fifth signals having amplitude characteristics indicative of said time of reception of said pulses; combining means coupled to said filtering means for forming a common signal having amplitude characteristics indicative of said time of reception of said pulses; and detecting and signal generating means coupled to said combining means to receive said common signal to form control signals and coupled to said control inputs of said gating means for passing said control signals to control the time of gating of said pulses of intermediate frequency signals.

4. A pulsed radar receiver for filtering and gating pulses of radio frequency signals received at varying times from an antenna, said radio frequency signals including directional information, said receiver comprising: a mixer coupled to said antenna for forming pulses of intermediate frequency signals from said pulses of radio frequency signals; gating means including a range gate coupled to said mixer for passing said pulses therethrough and including a control circuit coupled to said range gate for passing time portions of said pulses having characteristics indicative of the time of reception of said pulses from said antenna, said gating means having control inputs; filtering means coupled to said control means for developing first and second signals from said time portions of said pulses and coupled to said range gate for developing third signals from said pulses passed therethrough; combining means coupled to said filtering means for combining said first, second and third signals into a common signal; normalizing means coupled to said combining means for amplifying said common signal; and detecting and pulse forming means coupled to said normalizing means to receive the amplified common signal for developing a signal indicative of said directional information and for forming timing pulses indicating the time of reception of said pulses from said antenna, said detecting and pulse forming means coupled to said control inputs of said gating means to pass said timing pulses to control said time of gating of said pulses received from said antenna and to control said control circuit.

5. A time gating system for gating pulses of intermediate frequency signals in a radar receiver, said pulses occurring at varying times, said intermediate frequency signals including carrier waves having sideband angle scan components and undesired sideband noise components, said radar receiver including filter means for filtering out said sideband noise components, said gating system comprising: a range gate for passing said pulses of intermediate frequency signals, said range gate having a control input; control means coupled to said range gate for passing a first and a second portion of said pulses, said portions having time of duration characteristics indicative of the time of reception of said pulses by said range gate, said filter means coupled to said control means and to said range gate for filtering out said sideband noise components from said first and second portion and from said pulses received from said range gate and for passing said carrier waves of said first and second portions and of said pulses from said range gate as first, second and third continuous waves having amplitude characteristics indicative of the time of reception of said pulses by said gate, said control means having a control input; combining means coupled to said filter means for combining said first, second and third continuous waves into a common signal; and means coupled to said combining means for forming control pulses in response to said common signal and coupled to said control input of said control means for controlling the first and second portions of said control pulses passed therethrough and coupled to said control input of said range gate for controlling the time of gating said pulses of intermediate frequency signals.

6. A time gating system for deriving gating information from a pulsed signal received from a source, said pulsed signal including pulses having a varying time of occurrence, said pulses including carrier waves having sideband components, said system comprising: gating means coupled to said source for passing said pulses of said pulsed signals, said gating means having an input terminal for receiving control pulses for controlling the time of gating; an early and late gate circuit coupled to said gating means for passing an early portion and a late portion of said pulses of said signals received from said gating means, said portions having time characteristics indicative of the time of occurrence of said pulses of said pulsed signal, said early and late gate circuit having an input terminal for receiving said control pulses to control said early and late portions of said pulses of said pulsed signals; combining means coupled to said early and late gate circuit and to said gating means for forming a combined signal having amplitude characteristics indicative of the time of reception of said pulsed signals; and pulse forming means coupled to said combining means for forming said control pulses having a time of occurrence dependent upon said amplitude characteristics of said combined signal, said pulse forming means being coupled to said input terminal of said early and late gate circuit for controlling said early portion and said late portion of said pulses of said pulsed signals and coupled to said input terminal of said gating means for controlling the time of gating to pass said pulses of said pulsed signals through said gating means.

7. A radar time gating system for receiving pulsed signals from an antenna, said pulsed signals having pulses occurring at varying rates, said pulses including signals having carrier waves and undesired sideband components, said system including filter means for filtering of said pulses to pass only the carrier waves of said pulse of signals, said system comprising: gating means coupled to said antenna, said gating means including a range gate for gating said pulses of said pulsed signals and including an early gate for passing an early gate portion of said pulses of said pulsed signals passed through said range gate and a late gate for passing a late gate portion of said pulses of said pulsed signals passed through said range gate, said gating means having a control input for receiving control pulses, said filter means coupled to said gating means for passing said carrier waves of said signals of said early and said late gate portions of said pulses of said pulsed signals, said carrier waves of said early and said late gate portions having amplitude characteristics indicative of the time position of said pulses of said pulsed signals, said filter means coupled to said range gate for passing said carrier waves of said pulses as a reference signal; and pulse generating means coupled to said filtering means for responding to the amplitude characteristics of said carrier waves to form said control pulses indicative of the rate of occurrence of said pulses of said pulsed signals, said pulse generating means coupled to said control input of said gating means for controlling said range gate and for controlling said early gate and said late gate to pass said pulses of said pulsed signals through said range gate as said rate of occurrence of said pulses of said pulsed signals varies.

8. A pulsed radar range gate responding to pulses of radio frequency signals received at varying times from an antenna, said radio frequency signals having a carrier wave and undesired sideband signals, said gate comprising: a mixer for heterodyning said pulses of radio frequency signals to pulses of intermediate frequency signals; a range gate coupled to said mixer for passing said pulses of intermediate frequency signals, said range gate having a control input; a phase inverter coupled to said range gate for receiving and inverting said pulses of said intermediate frequency signals; an early gate coupled to said phase inverter to receive said pulses of said inverted intermediate frequency signals and to pass a signal, said early gate having a control input; a late gate coupled to said range gate to receive said pulses of said intermediate frequency signals and to pass a signal, said late gate having a control input; a first filter coupled to said early gate and to said late gate for receiving said signals from said early gates and said late gates, for passing a first carrier wave having amplitude characteristics indicative of the time of reception of said pulses by said range gate and for filtering out said undesired sideband signals; an amplifier coupled to said first filter; detector means coupled to said amplifier; a second filter coupled between said range gate and said amplifier for filtering out said undesired sideband signals and for passing a second carrier wave having amplitude characteristics for normalizing said amplifier; and a range tracking generator coupled to said detector means and coupled to said control inputs of said early gate and said late gate and said range gate for controlling signals passed through said early and said late gates and for controlling the time of opening of said range gate, whereby said first carrier waves from said first filter are detected in said detector means to control said range tracking generator.

9. A pulsed radar range gate for passing pulses of radio frequency signals received at varying rates from an antenna, said pulses including a carrier wave and undesired sideband signals, said gate comprising: mixing means coupled to said antenna for heterodyning said pulses of radio frequency signals to pulses of intermediate frequency signals; a range gate coupled to said mixing means for opening to pass said pulses of said intermediate frequency signals; an early and late gate circuit coupled to said range gate for forming signals having characteristics indicative of the time of reception of said pulses from said antenna; first means coupled to said early and late gate circuit for filtering out said undesired sideband signals and to pass only the carrier waves of said intermediate frequency signals and coupled to said range gate for forming a combined signal having amplitude characteristics indicative of the time of reception of said pulses from said antenna; and second means coupled to said first means for forming control pulses at times as determined by said amplitude characteristics of said combined signal, said second means coupled to said early and late gate circuit and to said range gate for controlling said characteristics of said signals from said early and late gate circuit and for controlling the time of opening of said range gate to thereby pass said pulses of said intermediate frequency signals as said rate of reception of said pulses of radio frequency signals varies.

10. A range gating system utilized in a radar receiver for time gating signals, said signals including pulses of radio frequency signals received at varying times from an antenna, said radio frequency signals including carrier waves and sideband components, said receiver having mixing means coupled to said antenna for heterodyning said radio frequency signals to intermediate frequency signals, said system including filtering means for filtering said intermediate frequency signals to pass only the carrier wave of said intermediate frequency signals, said system comprising: a range gate coupled to said mixing means for opening to pass said pulses of intermediate frequency signals, said range gate having a control input; early and late gating means for forming a first and a second signal coupled to said range gate to receive said intermediate frequency signals and coupled to said filtering means to pass only the carrier waves of said first and second signals through said filtering means, said carrier waves of said first and said second signal having amplitude characteristics indicative of the time position of said intermediate frequency signal, said filtering means coupled to said range gate for passing carrier waves of said pulses as a reference signal therefrom, said early and late gating means having a control input; combining means coupled to said filtering means for adding the carrier waves of said first and second signals and said reference signal; and detecting and pulse generating means coupled to said combining means for forming pulses at a time of occurrence proportional to the amplitude characteristics of said carrier waves of said first and second signals and said reference signal, said detecting and pulse generating means coupled to said control input of said early and late gating means for controlling the relative amplitude of said carrier waves of said first and said second signals and coupled to said control input of said range gate for controlling the time of opening of said range gate.

11. A range gating system for time gating pulsed signals, said pulsed signals including pulses of radio frequency signals received at varying rates from an antenna, said radio frequency signals including carrier waves having sideband components, said system comprising: mixing means coupled to said antenna for heterodyning said radio frequency signals to pulses of intermediate frequency signals; a range gate coupled to said mixing means for gating said pulses of intermediate frequency signals, said range gate having a control input; an early and late gate circuit coupled to said range gate for passing an early portion and a late portion of said pulses of said intermediate frequency signals, said portions having time of duration characteristics indicative of the time of reception of said pulses from said antenna, said early and late gate circuit having a control input; first means coupled to said early and late gate circuit for receiving said early portions and said late portions of said pulses of said intermediate frequency signals for passing only the carrier waves of said early portions and said late portions, said means coupled to said range gate for passing only the carrier waves of said pulses; third means coupled to said first and second means for combining said carrier waves into a common signal, said first and second means including storage elements for providing amplitude characteristics to said common signal indicative of the time of reception of said pulses of said pulsed signals; fourth means coupled to said third means for forming gating pulses in response to said common signal, said fourth means coupled to said control input of said early and late gate circuit and to said control input of said range gate for controlling said gating of said pulses of said intermediate frequency signal in response to said gating pulses, thereby passing said pulses of said intermediate frequency signals through said range gate as said rate of receiving said pulses of radio frequency signals from said antenna varies.

12. A radar time gating system for receiving pulses of intermediate frequency signals at varying rates from an antenna, said pulses including carrier waves, said system including filter means for narrow band filtering of said pulses to pass the carrier waves of said pulses of signals received from said antenna and to filter out said undesired sideband signals, said system comprising: gating means coupled to said antenna including a range gate for gating said pulses and including an early gate for passing an early gate portion of said pulses and a late gate for passing a late gate portion of said pulses, said filter means coupled to said gating means for developing continuous carrier waves of said early and said late gate portions and coupled to said range gate for developing a continuous reference wave from the carrier waves of said pulses, said continuous carrier waves early and said late signals and said continuous reference wave having amplitude characteristics indicative of the time position of said pulses, said gating means having a timing input; detectng means coupled to said gating means for detecting said amplitude characteristics of said carrier waves of said early and said late gate portions of said pulses and said continuous reference wave to form an error signal indicative of the time position of said pulses; and a gating signal generator for forming timing signals coupled to said detecting means to receive said error signal and coupled to said timing input of said gating means for controlling said range gate and for controlling said early gate and said late gate to pass said pulses of said signals received from said antenna through said range gate as said rate of receiving said pulses varies.

13. A radar range gating system for receiving pulses of radio frequency signals at varying rates from an antenna, said pulses including carrier waves and undesired sideband components, said system gating said pulses and passing directional information received from said antenna to direction detecting circuits, said system comprising: mixing means coupled to said antenna for receiving said pulses and for heterodyning said pulses of radio frequency signals to pulses of intermediate frequency signals; range gating means coupled to said mixer for gating said pulses of intermediate frequency signals, said range gating means having a control input; a phase inverter coupled to said range gate for inverting said intermediate frequency signals; an early gate coupled to said phase inverter for receiving the inverted pulses of said intermediate frequency signals and for passing an early portion of said pulses; said early gate having a control input; a late gate coupled to said range gate for receiving said pulses of said intermediate frequency signal for passing a late portion of said signal; said late gate having a control input; filter means coupled to said early gate and said late gate for receiving said early portion and said late portion of said pulses for filtering out said undesired sideband components, said filtering means having storage characteristics for passing said carrier wave of said early portion of said intermediate frequency pulses as a continuous carrier wave, said continuous carrier wave having amplitude and phase characteristics indicative of the time of reception of pulses; balance modulator means coupled to said first filter means for forming sideband signals from said continuous carrier wave; second filter means coupled to said range gate for passing the carrier waves of said intermediate frequency signals, said second filter means having storage characteristics for forming a continuous carrier wave; a summing circuit coupled to said balanced modulating means and coupled to said second filter means for forming a combined signal from said sideband signals and said continuous carrier wave from said second filter; amplifier means coupled to said summing means for amplifying said combining signal; first detecting means coupled to said amplifying means for forming a signal having characteristics indicative of said directional characteristics and coupled to said direction detection circuits for passing said signals thereto; second detecting means coupled to said first detecting means for forming error signals indicating the time of reception of said pulses by said antenna; and a range tracking generator coupled to said second detecting means for receiving said error signal and for forming control pulses, said range tracking generator coupled to said control inputs of said late gate, said early gate and said range gate for controlling the time of gating said pulses of intermediate frequency signals as said rate of receiving said pulses from said antenna varies.

14. A radar time gating system for receiving pulses of signals from an antenna, said pulses occurring at varying rates, said signals including carrier waves and sideband signals, said system comprising: range gating means coupled to said antenna for gating said pulses of signals, said range gating means having a control input; an early gate and a late gate coupled to said range gate for passing an early portion and a late portion of said pulse passed through said range gating means; said early gate and said late gate having control inputs; first filter means coupled to said early gate and to said late gate for developing first signals from only the carrier waves of said early portion and said late portion of said pulses, said first signals having amplitude characteristics indicative of said time of reception of said pulses by said antenna; modulating means coupled to said first and second filter means for forming third and fourth signals respectively from said first and second signals having frequency characteristics for distinguishing between said early portion and said late portion of said carrier waves; second filter means coupled to said range gating means for developing second signals from only said carrier waves of said pulses, said second signals having reference amplitude characteristics; combining means coupled to said modulating means for forming a combined signal from said third and fourth signals, said combined signal having said frequency characteristics for distinguishing between said early portion and said late portion of said carrier waves; detecting means coupled to said combining means for forming an early error signal and a late error signal having characteristics proportional to the amplitude of said carrier waves; and a pulse generator coupled to said detecting means for receiving said early error signals and said later error signals to form pulses at a time indicative of the time of reception of said pulses by said antenna, said pulse generator coupled to said control inputs of said early gate and said late gate for controlling said early portion and said late portion of said pulses and coupled to said control input of said range gate for controlling the time of gating said pulses received from said antenna.

15. A range gating system for time gating pulsed signals, said pulsed signals including pulses of radio frequency signals received at varying rates from an antenna, said radio frequency signals including carrier waves having sideband components, said system comprising: mixing means coupled to said antenna for heterodyning said pulses of radio frequency signals to pulses of intermediate frequency signals; a range gate coupled to said mixing means for gating said pulses of intermediate frequency signals in response to control pulses; an early and late gate circuit coupled to said range gate for passing an early portion and a late portion of said pulses of said intermediate frequency signals passed through said range gate in response to control pulses, said early and late portions having time characteristics indicative of the time of reception of said pulses from said antenna; filterng means coupled to said early gate and said late gate circuit for filtering out said sideband components of said early portion and said late portion of said pulses, said filtering means having storage characteristics for passing said carrier waves of said early portion and said late portion as continuous carrier waves having amplitude characteristics indicative of the time of reception of said pulses by said antenna; modulating and combining means coupled to said filtering means for receiving said continuous carrier waves to form a common signal having said continuous carrier waves of said early gate and said late gate portion of said pulses modulated to a first and a second frequency; a first filter coupled to said modulating and combining means for passing only said continuous carrier wave at said first frequency; a second filter coupled to said modulating and combining means for passing only said continuous carrier wave at said second frequency; amplitude detecting means coupled to said first and second filters for receiving said continuous waves passed through said first and said second filters for forming first and second error signals indicative of the time of reception of said pulses by said antenna; and a pulse generator coupled to said first and second amplitude detectors for forming control pulses at times controlled by said error signals, said pulse generator coupled to said early and said late gate for controlling said early portion and said late portion of said intermediate frequency pulses passed through said gates and coupled to said range gate for controlling the time of passing said pulses of intermediate frequency signals.

16. A radar time gating system for receiving pulses of signals, said pulses occurring at varying times, said pulses of signals including carrier waves and sideband components, said system comprising: range gating means coupled to said antenna for gating said pulses, said range gating means having a timing input; an early gate and a late gate coupled to said range gate for passing an early portion and a late portion of said pulses received from said range gating means, said early gate and said late gate having timing inputs; filter means coupled to said early gate and to said late gate for filtering out said sideband components from said early portion and said late portion of pulses and for passing the carrier waves of said early portion and said late portion of pulses, said carrier waves having amplitude characteristics indicative of time of reception of said pulses of said antenna; modulating means coupled to said filter means for forming a combined signal including said carrier waves of said early portion and said late portion of said pulses, said carrier waves modulated to have frequency characteristics for distinguishing said early portion and said late portion of said pulses; phase detecting means coupled to said modulating and combining means for forming an early gate signal and a late gate signal having characteristics proportional to the amplitude of said carrier waves of said early portion and said late portion of said pulses; and a range tracking generator coupled to said phase detecting means for receiving said early gate signals and said late gate signals to form pulses at times indicative of the time of reception of said pulses of signals by said antenna, said pulse generator coupled to said timing inputs of said early gate and to said late gate for controlling the time duration of said early portion and said late portion of said pulses and coupled to said timing input of said range gate for controlling the time of gating of said pulses received from said antenna.

17. A system for range gating and for filtering pulses of radio frequency signals received at varying times from an antenna in a pulsed radar receiver, said radio frequency signals including a carrier wave having undesired sideband components, said system comprising: mixing means coupled to said antenna for heterodyning said pulses of radio frequency signals to pulses of intermediate frequency signals; gating means coupled to said mixing means for gating said pulses and for passing an early portion and a late portion of said pulses passed through said range gate, said portions having time characteristics indicative of the time of reception of said pulses from said antenna, said gating means having a control input; filtering means coupled to said gating means for filtering out said sideband components and for passing said carrier waves of said early portion and said late portion; modulating means coupled to said filtering means for modulating said carrier waves of said early portion and said late portion to sideband signals having a first and second frequency and for combining said sideband signals into a common signal; phase detecting means coupled to said modulating means for receiving said common signal and for detecting said sideband signals of said first and second frequency to form first and second error signals; and pulse forming means coupled to said phase detecting means for forming timing signals indicative of the time of reception of said pulses from said antenna, and coupled to said control inputs of said gating means to pass said timing pulses to control the time of gating of said pulses received from said antenna.

18. A radar receiver for filtering and gating pulses of radio frequency signals received at varying times from an antenna, said radio frequency signals having characteristics indicative of directional information, said receiver comprising: a mixer coupled to said antenna for developing pulses of intermediate frequency signals from said pulses of radio frequency signals; gating means coupled to said mixing means for developing first and second signals having amplitude characteristics indicative of the time of reception of said pulses by said antenna; filtering means coupled to said gating means for developing third and fourth signals in response to said first and second signals respectively, and coupled to said mixer for developing fifth signals from the pulses of intermediate frequency signals; combining means coupled to said filtering means for combining said third, fourth and fifth signals into a common signal; and detecting and pulse forming means coupled to said combining means for developing sixth signals indicative of the directional information, said detecting means and pulse forming means coupled to said gating means to control the time of gating of said pulses received from said antenna.

References Cited in the file of this patent

UNITED STATES PATENTS 2,688,743     Berger _________________ Sept. 7, 1954